Dec. 17, 1963    F. R. MORTIMER    3,114,522
VEHICLE ARRESTER GEAR WITH BRAKING DEVICE FOR AIRCRAFT
Filed Nov. 10, 1960    4 Sheets-Sheet 1

INVENTOR
Frank Radcliffe Mortimer
by Benj. T. Rauber
his attorney

Dec. 17, 1963   F. R. MORTIMER   3,114,522
VEHICLE ARRESTER GEAR WITH BRAKING DEVICE FOR AIRCRAFT
Filed Nov. 10, 1960   4 Sheets-Sheet 2

INVENTOR
Frank Radcliffe Mortimer
by Benj. T. Barber
his attorney

Dec. 17, 1963   F. R. MORTIMER   3,114,522
VEHICLE ARRESTER GEAR WITH BRAKING DEVICE FOR AIRCRAFT
Filed Nov. 10, 1960   4 Sheets-Sheet 3
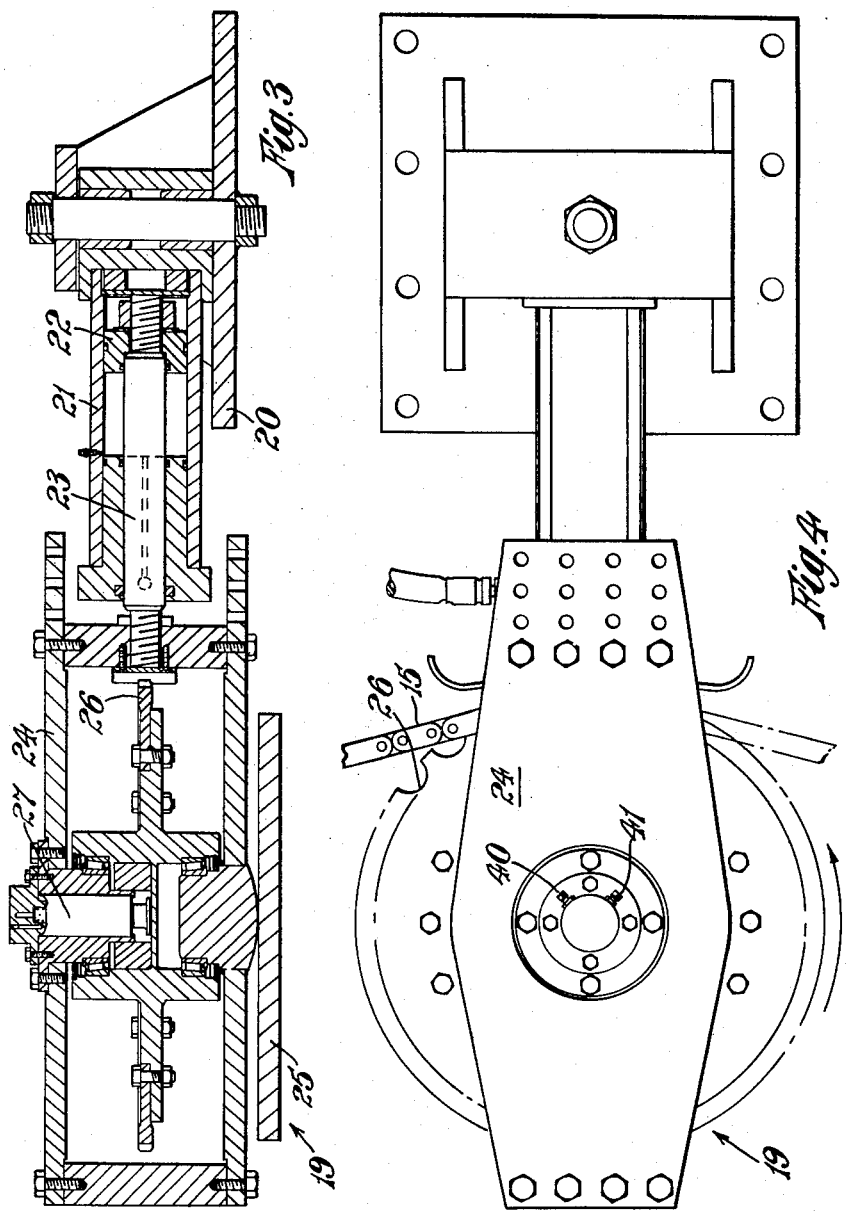
INVENTOR
Frank Radcliffe Mortimer Dec. 17, 1963   F. R. MORTIMER   3,114,522
VEHICLE ARRESTER GEAR WITH BRAKING DEVICE FOR AIRCRAFT
Filed Nov. 10, 1960   4 Sheets-Sheet 4
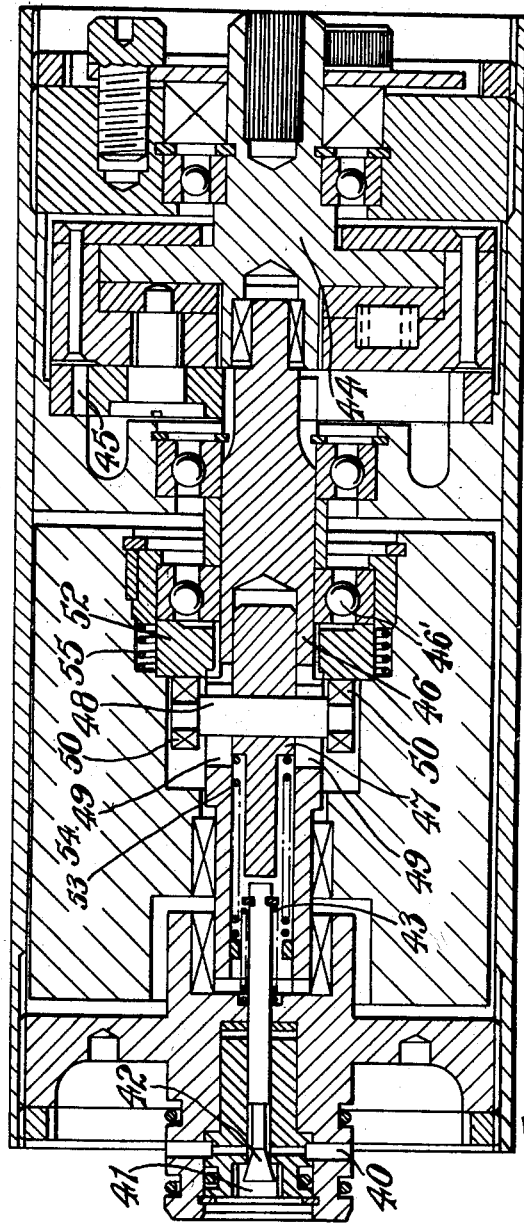
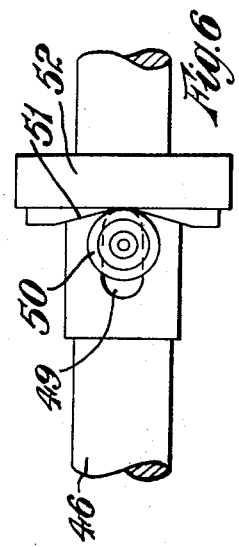
INVENTOR
Frank Radcliffe Mortimer
by Benj. T. Rauber
his attorney

United States Patent Office 3,114,522
Patented Dec. 17, 1963

1

3,114,522
VEHICLE ARRESTER GEAR WITH BRAKING DEVICE FOR AIRCRAFT
Frank Radcliffe Mortimer, Coventry, England, assignor to Dunlop Rubber Company Limited, London, England, a British company
Filed Nov. 10, 1960, Ser. No. 68,453
Claims priority, application Great Britain Nov. 12, 1959
10 Claims. (Cl. 244—110)

The invention relates to vehicle arrester gear and more particularly relates to arrester gear for aircraft landing on a runway.

Runway arrester gear, as opposed to arrester gear for the flight-decks of aircraft carriers, comprises a length of cable or the like suspended horizontally between two upright posts and arranged to catch on the main undercarriage legs of the landing aircraft. The ends of the cable or the like are associated with decelerating devices which may comprise heavy lengths of chain or hydraulic mechanisms or braking devices to decelerate the cable or the like as it is progressively drawn out by the landing aircraft, thereby decelerating said aircraft. Arrester gear of this nature is usually employed only in an emergency, if the normal wheel brakes fail or are inadequate.

Devices of the kind described above have the disadvantage that, having once been set in readiness, they are adapted to cope only with aircraft within a certain predetermined range of weight and landing speeds. Thus arrester gear comprising a braking device of a certain torque capacity or a chain having a certain weight and length may decelerate one aircraft in an orderly and progressive manner but if a much smaller and lighter aircraft flies into it it will decelerate it in far too abrupt a manner and may cause considerable damage.

The object of the present invention is to provide arrester gear comprising a braking device for a cable or the like wherein this difficulty is overcome.

The invention accordingly provides arrester gear for vehicles comprising an arrester cable or the like engageable by the vehicle, a braking device operable to brake the cable when the cable is accelerated by engagement thereof by the vehicle and a rotary inertia device responsive to deceleration of the cable and arranged to reduce the braking action of the braking device when said deceleration attains a predetermined value.

The arrester gear preferably includes a control unit responsive to tension applied to the cable and arranged to apply the braking device in response to such tension.

Preferably it also includes lengths of chain attached to the ends of the cable and each engaging a sprocket fitted with a hydraulic brake.

One embodiment of aircraft arrester gear according to the invention will now be described in detail, by way of example with reference to the accompanying drawings in which:

FIGURE 3 is a side elevation of a control unit;

FIGURE 4 is a corresponding plan view;

FIGURE 5 is a sectional view on a larger scale of the rotary inertia device contained within the control unit and, FIGURE 6 is a view looking in the direction of the arrow X in FIGURE 5, with the flywheel removed.

Figure 1:
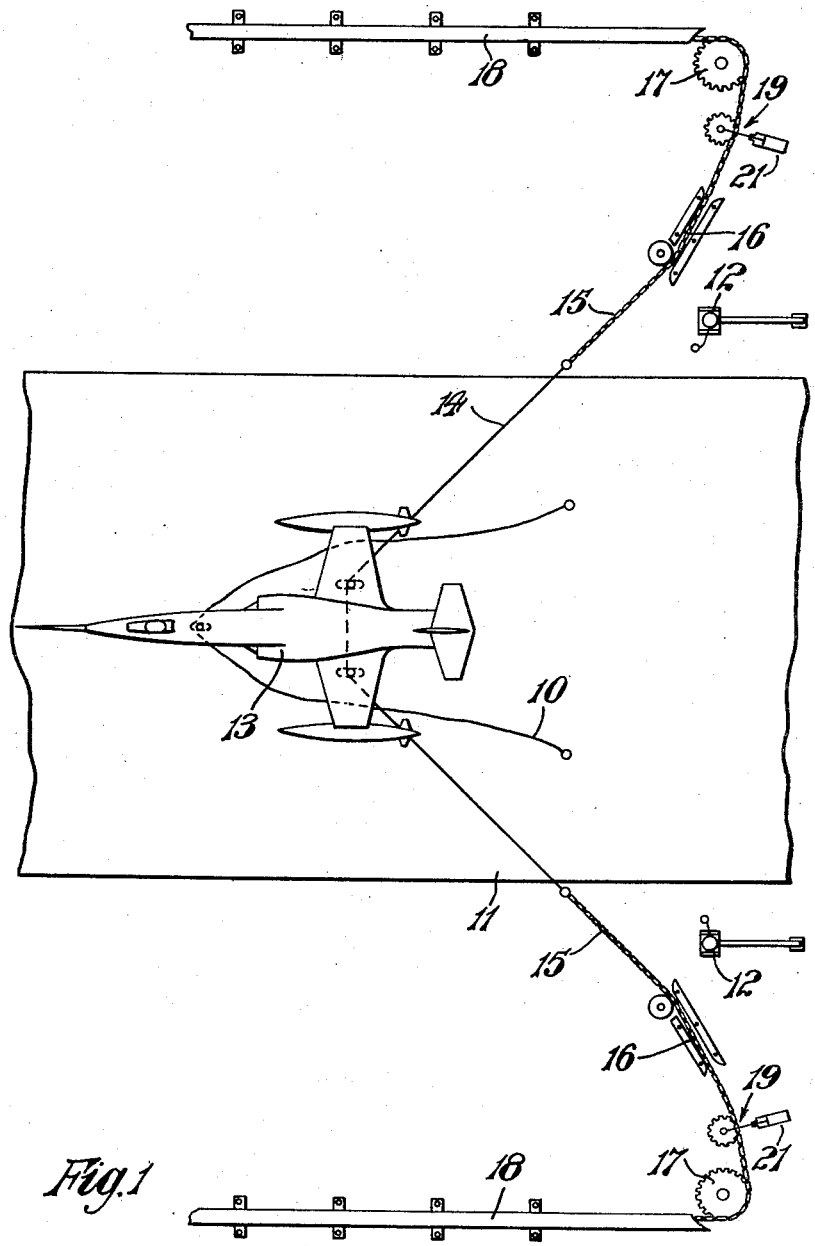
FIGURE 1 is a diagram showing the general layout of the apparatus.

The apparatus shown in FIGURE 1 includes a trigger cable 10 initially stretched across the runway 11 between arresting posts 12. The trigger cable catches on the nose wheel strut of the landing aircraft 13 and, when tensioned thereby, raises an arresting cable 14 into the path of the main wheel struts. Weak links in the trigger cable 10 then shear. Alternatively the arrester cable 14 may be raised into its intercepting position by explosive charges. Each end of the arrester cable 14 is connected to a roller chain 15 which passes through a chain guide 16 and around a braking sprocket 17. The bulk of each chain is located in and extends freely along a long housing 18 extending alongside the runway 11. Located between each chain guide 16 and the adjacent braking sprocket 17 is a control unit 19 comprising, as later described, a hydraulic piston and cylinder mechanism which is operatively connected to a hydraulically-operated brake associated with the adjoining sprocket 17 and actuated by the tension in the chain 15 as it is dragged out of its housing 18 by the landing aircraft.

Each control unit 19, as shown in FIGURES 3 and 4, comprises a fixed base plate 20, to which is fixed a cylinder 21 containing a piston 22. The piston rod 23 is secured to a frame 24 which is non-rotatable but free to slide on a plate 25. Rotatably mounted in the frame 24 is a sprocket 26 about which the chain 15 passes. A rotary inertia mechanism 27, which is described in detail below, is located in a recess in the frame 24 and is driven by the sprocket 26.

Figure 2:
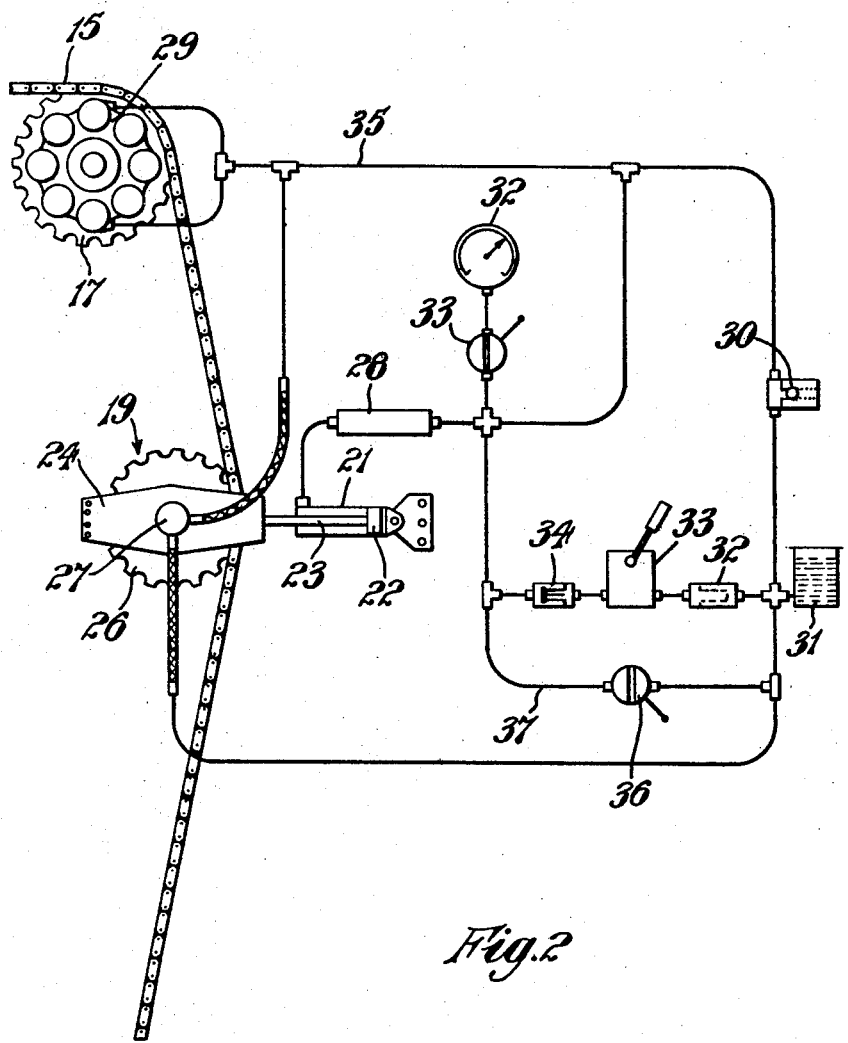
FIGURE 2 is a diagram showing one of the control units and the associated brake and hydraulic circuit.

The cylinder 21 is connected as shown in FIGURE 2 through a horizontally-mounted flow-restricting and damping device 28, of the kind described in British Patent No. 773,906, to a hydraulically-operated brake 29 for the sprocket 17. A relief valve 30 is adapted to blow at a predetermined pressure to prevent excessive application of the brake and is connected on its low pressure side to a reservoir 31 for liquid. A gauge 32, protected during operation of the arrester gear by a cock 33, is provided between the brake 17 and the damping device 28 for testing purposes. Interposed in the line between the reservoir 31 and the damping device 28 are a filter 32, a hand-operated pump 33' and a non-return valve 34. The inlet connection of the rotary-inertia device 27 is connected to the line 35 leading to the brake 29 and the exhaust connection of the rotary-inertia device 27 is connected to the reservoir 31. An on-off cock 36 is provided in a line 37 bypassing the hand pump, non-return valve and filter for the purpose of relieving the primed system.

The control unit 19 is primed preparatory to use by moving the on-off cock 36 to an appropriate position and by pumping liquid by means of the pump 33 from the reservoir 31 into the cylinder 21. This forces the piston 22 to the base of the cylinder as shown in FIGURE 2, and in doing so draws the frame 24 and the sprocket 26 in the same direction. The length of chain between the chain guide 16 (FIGURE 1) and the brake sprocket 17, hitherto straight, is deflected thereby to make an angle of the order of 130°.

As the main wheel struts of the landing aircraft first contact the cable 14 and then commence to deflect the cable, originally lying straight across the runway, into substantially V-shape, the chains 15 are drawn out of their associated housings 18. Each chain accelerates around its brake sprocket 17 until the cable has been deflected to form an angle of the order of 90°. The landing speed of the aircraft has not been substantially reduced at this stage. At this point, however, the tension begins to build up in the cable 14 and chains 15, and at the location between the chain guides 16 and the brake sprockets 17, each chain tends to straighten and to move the associated frame 24, sprocket 26 and piston 22 in the opposite direction to that to which they were moved by the hand pump 33.

The hydraulic pressure in the cylinders 21 thus builds up and commences to apply the brakes 29. As the sprockets 17 are braked and the speed of the chains 15 and of the aircraft thereby reduced, the tension in the chains 15 increases to further increase the braking load so that in ideal circumstances, the aircraft is swiftly and progressively brought to rest. In practice, however, the braking pressure may tend to build up too quickly but this is prevented by the pressure relief valve 30.

The rotary-inertia devices 27 function to enable the arrester gear to be used for all types of aircraft, irrespective of their weight and landing speed. Each of these devices is operatively connected to the associated sprocket 26 and is thus rotated by the chain passing around the sprocket as it is drawn out by the aircraft. The device is not responsive to acceleration of the cable, during approximately the first second after impact by the aircraft, but is responsive to deceleration only, i.e. after the brake has been applied. In response to deceleration of the chain, and hence of the aircraft, beyond a predetermined safe value, it automatically opens a valve to allow pressure in the brake to flow through the rotary inertia device and back to the reservoir. This temporarily relieves the braking pressure to relieve the tension in the chain. However the pressure from the cylinder almost immediately applies the brakes again. This "hunting" continues extremely rapidly to provide a constant and safe deceleration determined by the strength of the controlling spring in the rotary-inertia device.

The brakes 29 for controlling the angular speed of the sprockets 17 are preferably disc brakes of the kind normally employed in aircraft wheels.

After the aircraft has been first brought to rest and then removed from the runway the chains are retracted mechanically within their housings 18, the trigger cable 10 and the arrester cable 14 are re-set and the control units 19 are primed in the manner described ready for the next landing.

Arrester gear of the kind described is not confined to use on aircraft runways. It could also be used, for example, to decelerate railed vehicles, such as high-speed mono-rail vehicles.

The rotary inertia device 27 is shown in detail in FIGURES 5 and 6. It has an inlet 40 (FIGURE 4) connected to the line 35 (FIGURE 2) and an outlet 41 (FIGURE 4) connected to the reservoir 31. The inlet 40 and outlet 41 communicate by a passage way which is normally closed by a valve 42 (FIGURE 5) retained in the closed position by a spring 43.

The device 27 has an input shaft 44 driven by the sprocket 19 (FIGURE 4) and geared by epicyclic gearing 45 to a hollow shaft 46 mounted in bearings 46' in which is slidably mounted a valve thrust rod 47. A pin 48 fixed to the thrust rod 47 extends through opposed slots 49 in the shaft 46 and carries followers 50 engaging V-shaped cam faces 51 (FIGURE 6) on a driving ring 52. A spring 53 surrounding the thrust rod 47 maintains the followers 50 in engagement with the bases of the cam faces 51. The ring 52 drives a flywheel 54 through the agency of a driving spring 55.

When the chain 15 accelerates during the initial stage of arresting the aircraft, the input shaft 44 accelerates and sets the flywheel 54 in motion. When, however, the chain is decelerated as the result of application of the brake, the input shaft 44 begins to lag behind the flywheel and, in the event of the deceleration being sufficient to overcome the spring 53, the cams 51 will urge the followers 50 and thrust rod 47 to the left to open the valve 42 and so reduce the braking pressure.

Having now described my invention, what I claim is:
1. A decelerating apparatus for moving objects which comprises a cable positioned to be engaged and drawn by the moving object, at least one fixed, rotatable, pressure-actuated, braking element engaged by said cable to be rotated as said cable is drawn, means actuated by the tension on said cable to increase the braking pressure on said braking element as said tension increases, and a deceleration-responsive, rotary inertia, release element actuated by the speed of said cable successively to release said pressure on said braking element when the deceleration of said cable rises to a limit established by said release element and to restore said pressure on said braking element when said pressure falls below said limit.

2. An arresting apparatus for a moving object which comprises a cable positioned across the path of said moving object to be drawn by said object, an element rotatable by said cable as it is progressively drawn by said object, a friction brake to decelerate said element, means actuated by said cable to apply said friction brake with a braking force determined by the tension in said cable, and a deceleration-responsive, rotary-inertia device actuated with said element to apply a safe upper limit to the braking force applied to said brake.

3. An arresting apparatus for a moving object which comprises a cable positioned across the path of said moving object and engageable thereby, a rotatable element, a friction brake for said element, means engaged by said cable to rotate said element by movement of said cable, a fluid-pressure mechanism operable in one direction to impart an angular configuration to said cable, said mechanism being connected to said friction brake whereby tension tending to straighten said cable actuates said mechanism in the opposite direction to operate the brake with a force proportional to the tension in the cable and a deceleration-responsive, rotary-inertia, device successively to release said brake when the deceleration rises to a limit fixed by said device and to restore said pressure to said brake when said deceleration falls below said limit.

4. Apparatus for arresting an airplane which comprises a cable positioned across the path of the airplane to be engaged and drawn by the airplane, a fixed braking assembly for said cable on each side of the path of the airplane, each said braking assembly comprising a brake engaged by said cable and a rotary-inertia, deceleration-responsive, device actuated by said cable to release brake whenever the deceleration of said cable rises to a limit fixed by said device and to reapply said brake when the deceleration falls below said limit.

5. The apparatus of claim 4 in which said brake is a rotary brake and in which said cable comprises means to rotate said brake when said cable is drawn.

6. The apparatus of claim 5 in which both said brake and said rotary-inertia, deceleration-responsive, device are actuated by said cable.

7. The apparatus of claim 4 in which said brake is a fluid operated brake and in which means actuated by the tension in said cable supplies fluid under pressure to said brake proportional to said tension.

8. The apparatus of claim 7 in which said means comprises a cylinder and a piston engaging said cable to deflect it and in which fluid on one side of said piston is moved to increase the pressure of said fluid as the tension of said cable straightens said cable.

9. The apparatus of claim 8 comprising a conduit from said cylinder to said brake having a constriction therein.

10. The apparatus of claim 9 in which said rotary-inertia, deceleration-responsive, device is secured to said piston and in which said device has a wheel engaging and rotatable by said cable.

References Cited in the file of this patent
UNITED STATES PATENTS

| | | |
|---|---|---|
| 2,657,011 | Slonnenger | Oct. 27, 1953 |
| 2,663,386 | Fenley | Dec. 22, 1953 |
| 2,867,411 | Simmonds et al. | Jan. 6, 1959 |
| 2,902,232 | Jacobsen | Sept. 1, 1959 |
| 2,931,628 | Simmonds et al. | Apr. 5, 1960 |
| 2,950,086 | Abraham | Aug. 23, 1960 |
| 2,980,213 | Van Zelm et al. | Apr. 18, 1961 |
| 2,987,278 | Hoffman et al. | June 6, 1961 |
| 3,032,293 | Fonden et al. | May 1, 1962 |
| 3,057,587 | Puffe et al. | Oct. 9, 1962 |

FOREIGN PATENTS

| | | |
|---|---|---|
| 642,705 | Great Britain | Sept. 13, 1950 |
| 663,710 | Great Britain | Dec. 27, 1951 |